United States Patent
Wang (10) Patent No.: US 9,308,893 B2
(45) Date of Patent: Apr. 12, 2016

(54) ADAPTER OF A TIRE CEMENT DISPENSER

(71) Applicant: Wei-Chi Wang, Tainan (TW)

(72) Inventor: Wei-Chi Wang, Tainan (TW)

( * ) Notice: Subject to any disclaimer, the term of this patent is extended or adjusted under 35 U.S.C. 154(b) by 106 days.

(21) Appl. No.: 14/331,859

(22) Filed: Jul. 15, 2014

(65) Prior Publication Data

US 2016/0016559 A1 Jan. 21, 2016

(51) Int. Cl.
*B60S 5/04* (2006.01)
*B29C 73/02* (2006.01)
*B29C 73/24* (2006.01)
*B29C 73/16* (2006.01)
*B29L 30/00* (2006.01)

(52) U.S. Cl.
CPC . *B60S 5/04* (2013.01); *B29C 73/02* (2013.01); *B29C 73/166* (2013.01); *B29C 73/24* (2013.01); *B29L 2030/00* (2013.01)

(58) Field of Classification Search
CPC .................................. B60S 5/04; B29C 73/166
USPC ............................................. 141/38, 104, 105
See application file for complete search history.

(56) References Cited

U.S. PATENT DOCUMENTS

| | | | | |
|---|---|---|---|---|
| 6,736,170 B2* | 5/2004 | Eriksen | ................. | B29C 73/166 141/102 |
| 8,146,622 B2* | 4/2012 | Guan | .................... | B29C 73/166 141/114 |
| 8,505,591 B2* | 8/2013 | Eckhardt | ............... | B29C 73/166 141/100 |
| 8,733,407 B2* | 5/2014 | Eckhardt | ............... | B29C 73/166 141/104 |
| 8,978,717 B2* | 3/2015 | Nakao | .................... | B29C 73/166 141/38 |
| 9,114,573 B2* | 8/2015 | Wang | .................... | B29C 73/166 |

* cited by examiner

*Primary Examiner* — Timothy L Maust
(74) *Attorney, Agent, or Firm* — Ming Chow; Sinorica, LLC (57) ABSTRACT

An adapter of a tire cement dispenser has an adapting seat, an air valve mounted in the adapting seat, a flow direction switching device mounted in the adapting seat, a connector mounted on the adapting seat to hold the flow direction switching device in the adapting seat, and a switching button connected to the flow direction switching device. The adapting seat has an air inlet tube for connecting to an air pumping device, and an outlet tube for connecting to a tire. The adapter can be switched to allow the air pumping device to selectively inflate the tire and extrude tire cement for patching the tire. Since the adapter, the air pumping device, and the tire do not have to be connected to or disconnected from each other repeatedly, the tire cement dispenser with the adapter is convenient and time-saving for patching and inflating the tire.

20 Claims, 8 Drawing Sheets

ADAPTER OF A TIRE CEMENT DISPENSER

BACKGROUND OF THE INVENTION

1. Field of the Invention The present invention relates to a tire cement dispenser for patching tires of vehicles, such as automobiles, motorcycles, bicycles, and the like, especially to an adapter of the tire cement dispenser.

2. Description of the Prior Art(s)

A tire cement dispenser comprises a bottle filled with tire cement, and a conventional adapter mounted on a bottleneck of the bottle. The conventional adapter has an air inlet and a fluid outlet. When patching a tire with the tire cement in the tire cement dispenser, the air inlet of the conventional adapter is connected to an air pumping device, such as an electrical or nonelectrical air pump, and the fluid outlet of the conventional adapter is connected to a tire valve of a tire via a guiding tube. Then the air pumping device pumps high pressure air into the bottle that is filled with the tire cement via the conventional adapter. The high pressure air extrudes the tire cement to flow out of the bottle through the fluid outlet of the conventional adapter. The tire cement further flows through the guiding tube and then flows into the tire to patch the tire. Afterwards, the tire cement dispenser is disconnected from the tire valve of the tire, and the air pumping device is connected to the tire valve of the tire instead, so as to inflate the tire.

However, the conventional adapter of the tire cement dispenser is only used for allowing the high pressure air to extrude the tire cement to patch the tire. The air pumping device cannot inflate the tire through the conventional adapter. Therefore, when the tire cement dispenser has finished patching the tire, the tire cement dispenser has to be disconnected from the tire valve of the tire, and then the air pumping device is re-connected to the tire valve to inflate the tire. The above-mentioned processes of connecting and disconnecting the air pumping device, the conventional adapter of the tire cement dispenser, and the tire valve of the tire are troublesome and time-consuming.

To overcome the shortcomings, the present invention provides an adapter of a tire cement dispenser to mitigate or obviate the aforementioned problems.

SUMMARY OF THE INVENTION

The main objective of the present invention is to provide an adapter of a tire cement dispenser. The adapter has an adapting seat, an air valve, a flow direction switching device, a connector, and a switching button. The adapting seat has an air inlet tube for connecting to an air pumping device, and an outlet tube for connecting to a tire. The air valve is mounted in the adapting seat. The flow direction switching device is mounted in the adapting seat and has a central channel, a first side channel, and a second side channel. The connector is mounted on the adapting seat to hold the flow direction switching device in the adapting seat. The switching button is connected to the flow direction switching device.

The adapter can be switched to allow the air pumping device to selectively inflate the tire and extrude tire cement for patching the tire. Since the adapter, the air pumping device, and the tire do not have to be connected to or disconnected from each other repeatedly, the tire cement dispenser with the adapter is convenient and time-saving for patching and inflating the tire.

Other objectives, advantages and novel features of the invention will become more apparent from the following detailed description when taken in conjunction with the accompanying drawings.

DETAILED DESCRIPTION OF THE PREFERRED EMBODIMENTS

With reference to FIGS. 1 to 3 and 5, an adapter of a tire cement dispenser comprises an adapting seat 10, an air valve 20, a flow direction switching device 30, a connector 40, and a switching button 50.

Figure 2:
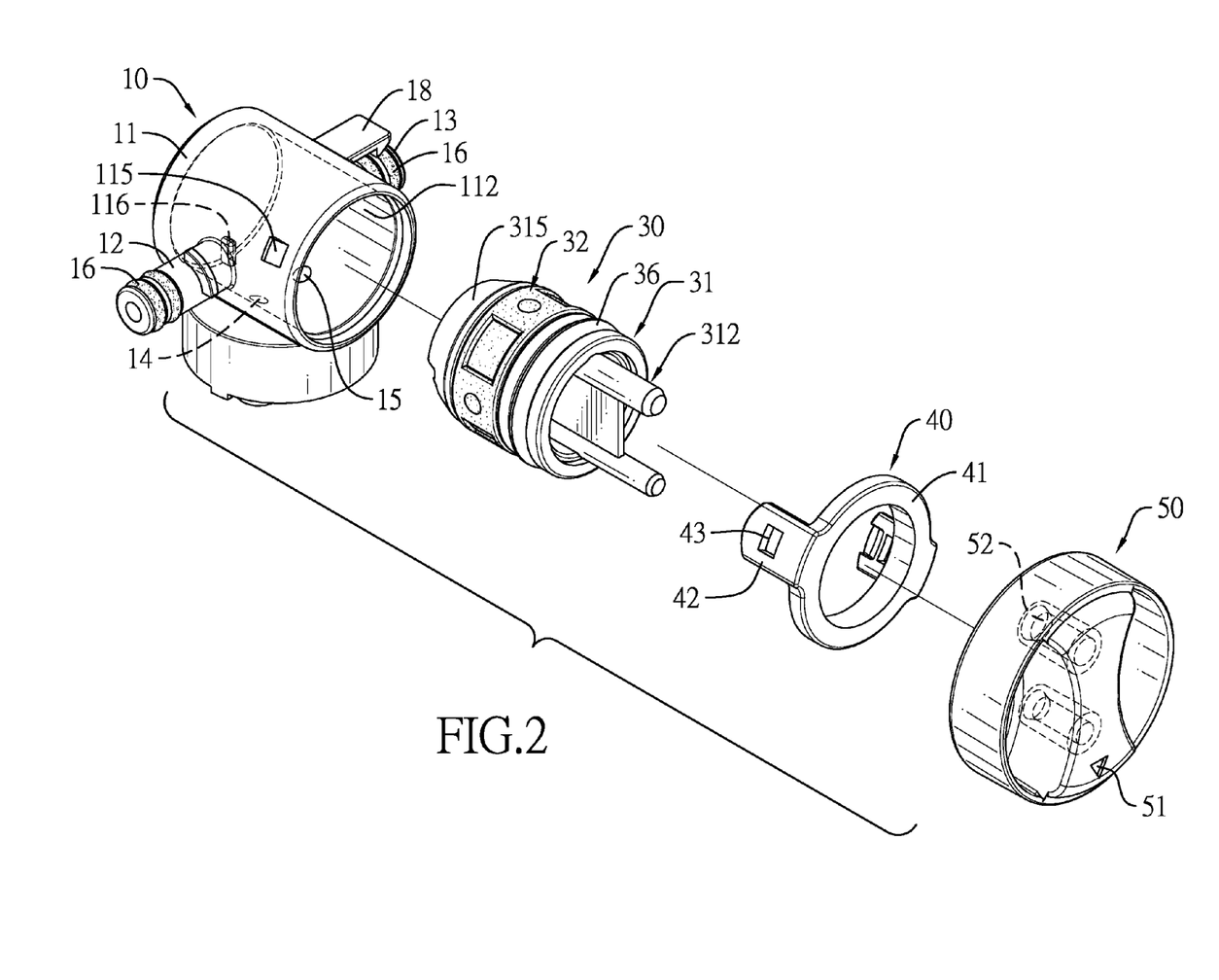
FIG. 2 is an exploded perspective view of the adapter in FIG. 1.
Figure 3:
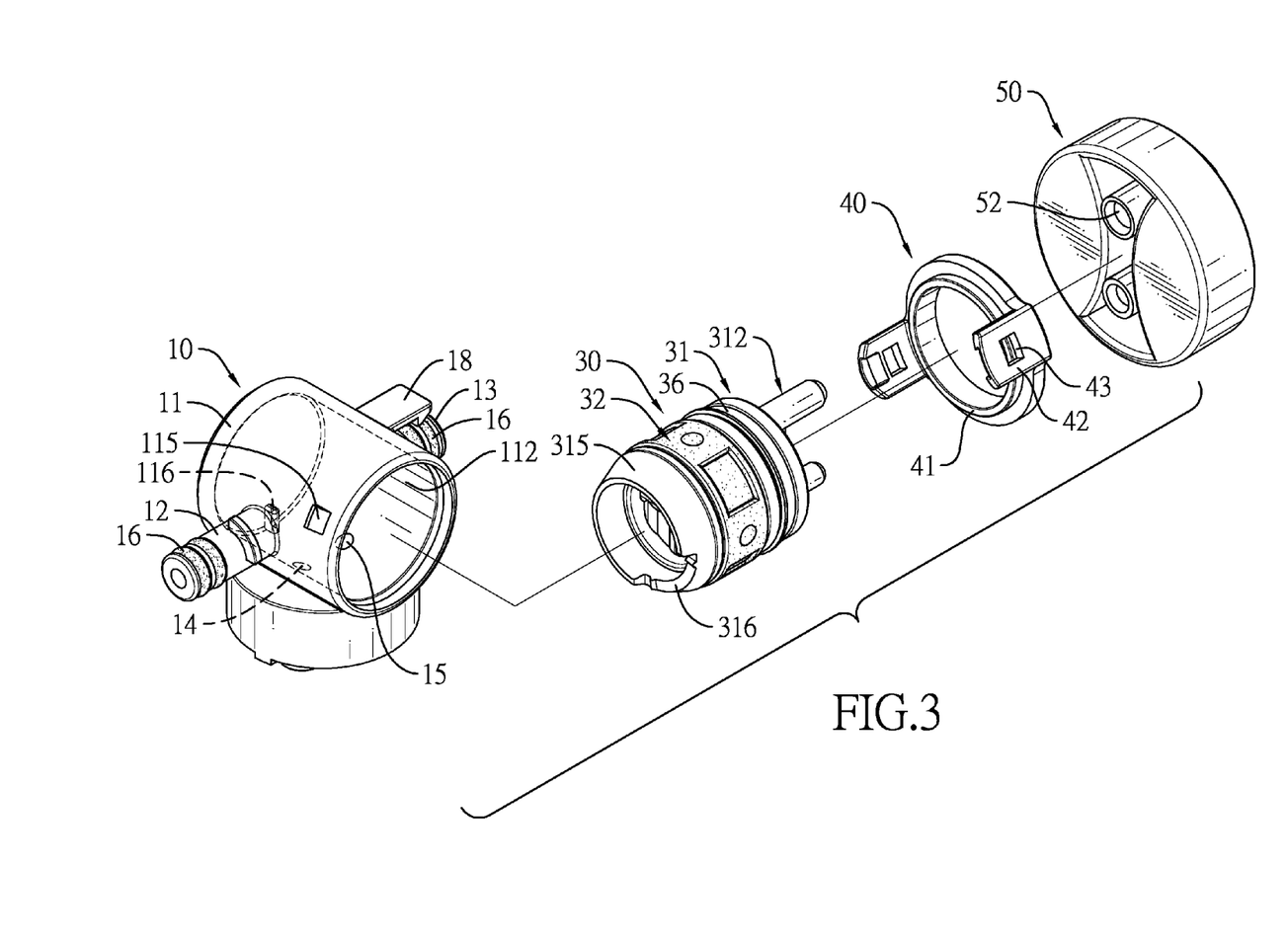
FIG. 3 is another exploded perspective view of the adapter in FIG. 1.
Figure 5:
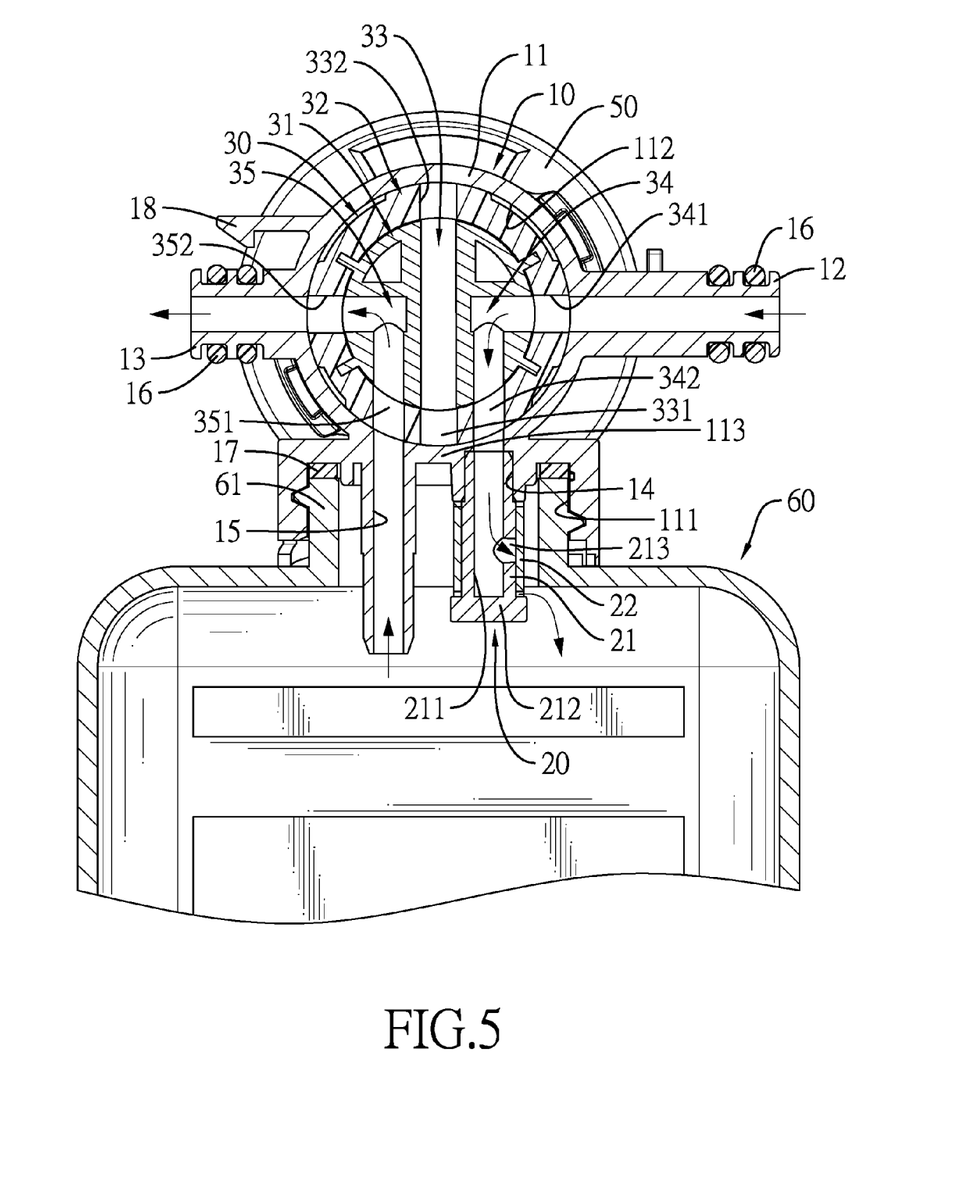
FIG. 5 is an operational cross-sectional rear view of the adapter in FIG. 1, showing the adapter is switched for patching a tire.
Figure 6:
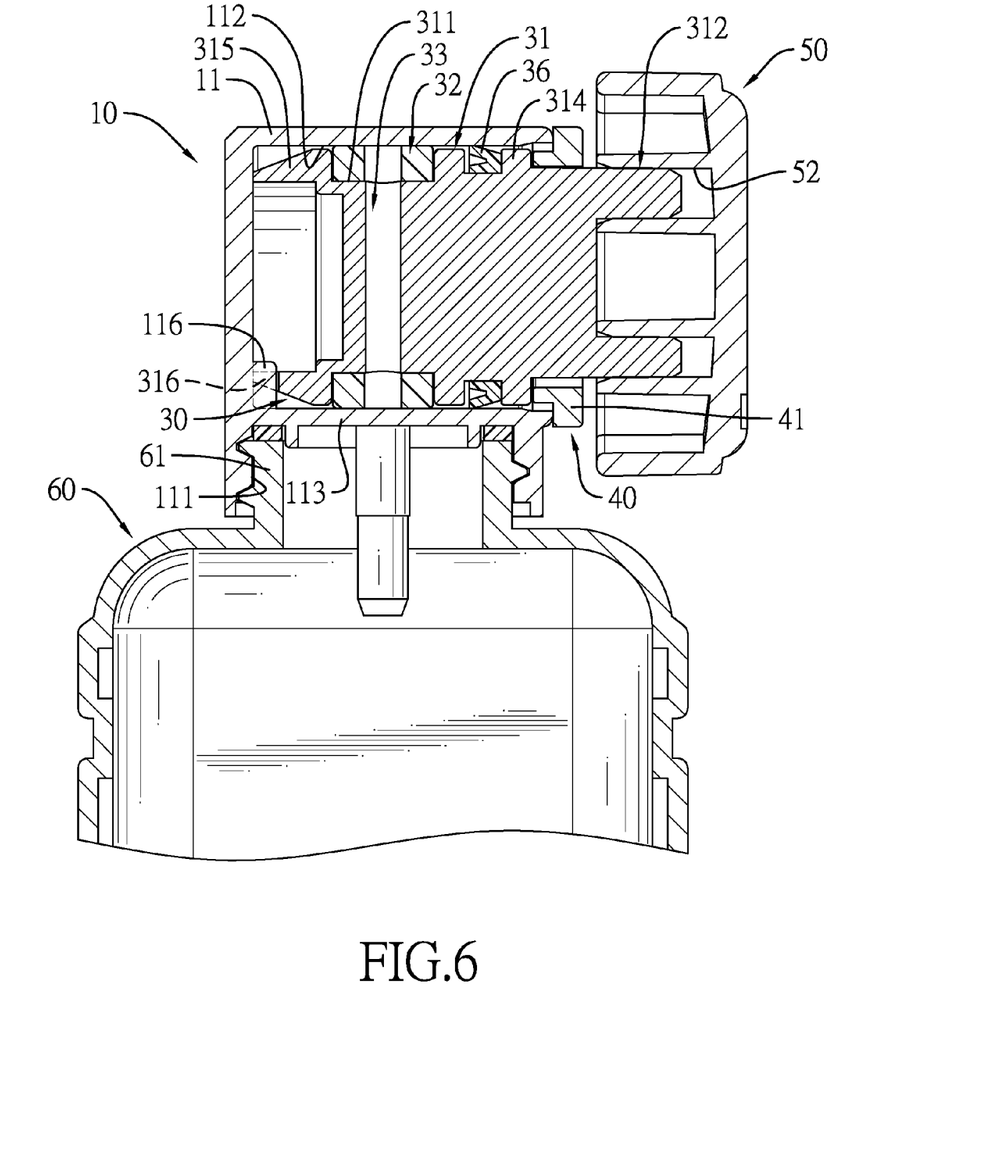
FIG. 6 is an operational cross-sectional side view of the adapter in FIG. 1, showing the adapter is switched for patching a tire.

As shown in FIGS. 2 and 3, and with reference to FIGS. 5 and 6, the adapting seat 10 has a mounting base 11, an air inlet tube 12, and an outlet tube 13.

The mounting base 11 has a mounting recess 111, a switching chamber 112, an inner surface, a dividing portion 113, an air inlet channel 14, and an outlet channel 15. The mounting recess 111 is formed in a bottom of the mounting base 11 and has a lower opening. A bottleneck 61 of a bottle 60 for containing tire cement is mounted into the mounting recess 111 of the mounting base 11 so as to be connected to the adapting seat 10 of the adapter. The switching chamber 112 is transversely formed above the mounting recess 111, is circular in cross-section, and has a front opening. The inner surface of the mounting base 11 is formed around the switching chamber 112. The dividing portion 113 is formed between the mounting recess 111 and the switching chamber 112. The air inlet channel 14 is longitudinally formed through the dividing portion 113 and communicates with the mounting recess 111 and the switching chamber 112. The outlet channel 15 is longitudinally formed through the dividing portion 113, is disposed apart from the air inlet channel 14, and communicates with the mounting recess 111 and the switching chamber 112.

The air inlet tube 12 is radially formed on and protrudes from an outer surface of the mounting base 11, communicates with the switching chamber 112, and is disposed adjacent to the air inlet channel 14. The outlet tube 13 is radially formed on and protrudes from the outer surface of the mounting base 11, communicates with the switching chamber 112, is disposed opposite to and aligns with the air inlet tube 12, and is disposed adjacent to the outlet channel 15.

As shown in FIGS. 2 and 3, and with reference to FIGS. 5 and 6, in the preferred embodiment, the mounting recess 111 of the mounting base 11 is circular in cross-section. The mounting base 11 has a threaded wall. The threaded wall of the mounting base 11 is formed around the mounting recess 111, such that the adapting seat 10 engages with the bottleneck 61 of the bottle 60 via the threaded wall. The adapting seat 10 further has multiple sealing rings 16 and a sealing pad 17. The sealing rings 16 of the adapting seat 10 are mounted around the air inlet tube 12 and the outlet tube 13. The sealing pad 17 is annular and is mounted in the mounting recess 111 on the dividing portion 113 of the mounting base 11. When the adapting seat 10 is mounted on the bottleneck 61 of the bottle 60, the sealing pad 17 tightly abuts an end edge of the bottleneck 61, such that a gap between the end edge of the bottleneck 61 and the dividing portion 113 of the mounting base 11 is sealed.

Figure 1:
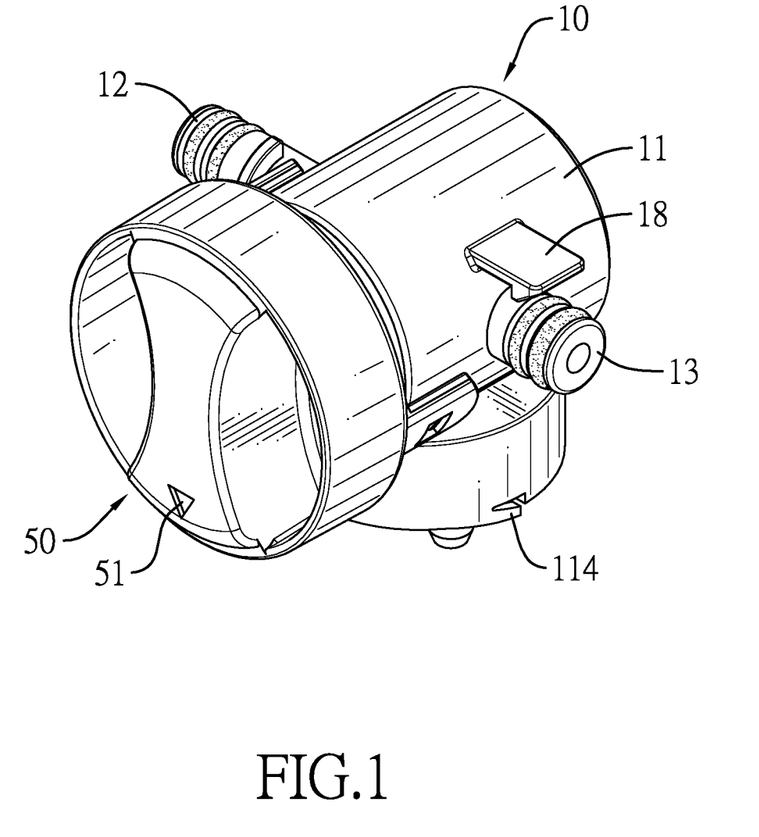
FIG. 1 is a perspective view of an adapter of a tire cement dispenser in accordance with the present invention.

As shown in FIGS. 1 to 3, in the preferred embodiment, the adapting seat 10 further has an engaging hook 18. The engaging hook 18 is formed on and protrudes from the outer surface of the mounting base 11, is disposed beside the outlet tube 13, and is used for hooking components that are mounted onto the outlet tube 13. The mounting base 11 further has a resilient protrusion 114. The resilient protrusion 114 is formed on the bottom of the mounting base 11. When the adapting seat 10 is mounted on the bottleneck 61 of the bottle 60, the resilient protrusion 114 resiliently abuts the bottle 60, such that the adapting seat 10 is securely held on the bottleneck 61.

As shown in FIG. 5, the air valve 20 is mounted to the air inlet channel 14 of the mounting base 11 of the adapting seat 10. The air valve 20 has a valve rod 21 and a resilient valve sleeve 22. The valve rod 21 is mounted to the air inlet channel 14 and has a sidewall, an upper open end, a lower closed end 212, an internal channel 211, and an air hole 213. The upper open end of the valve rod 21 protrudes into the air inlet channel 14 of the mounting base 11 of the adapting seat 10. The internal channel 211 is formed in the valve rod 21, and extends between the upper open end and the lower closed end 212 of the valve rod 21. The air hole 213 is radially formed through the sidewall of the valve rod 21. The resilient valve sleeve 22 is tubular and is made of resilient materials, such as rubber. The resilient valve sleeve 22 is mounted around the valve rod 21 and covers the air hole 213 of the valve rod 21.

As shown in FIGS. 2 to 5, the flow direction switching device 30 is pivotally mounted in the switching chamber 112 of the mounting base 11 of the adapting seat 10 and has an outer surface, a central channel 33, a first side channel 34, and a second side channel 35. It is airtight between the outer surface of the flow direction switching device 30 and the inner surface of the mounting base 11. The central channel 33, the first side channel 34, and the second side channel 35 are independent from each other.

The central channel 33 is radially formed in the flow direction switching device 30 and has a central inlet 331 and a central outlet 332. The first side channel 34 is formed in the flow direction switching device 30, is disposed beside the central channel 33, and has a first inlet 341 and a first outlet 342. The second side channel 35 is formed in the flow direction switching device 30, is disposed beside the central channel 33 and opposite to the first side channel 34, and has a second inlet 351 and a second outlet 352. The second inlet 351 of the second side channel 35 and the first outlet 342 of the first side channel 34 are oppositely disposed beside the central inlet 331 of the central channel 33. The second outlet 352 of the second side channel 35 aligns with the first inlet 341 of the first side channel 34. An axis extending through the first inlet 341 of the first side channel 34 and the second outlet 352 of the second side channel 35 is perpendicular to an axis extending through the central channel 33.

Figure 8:
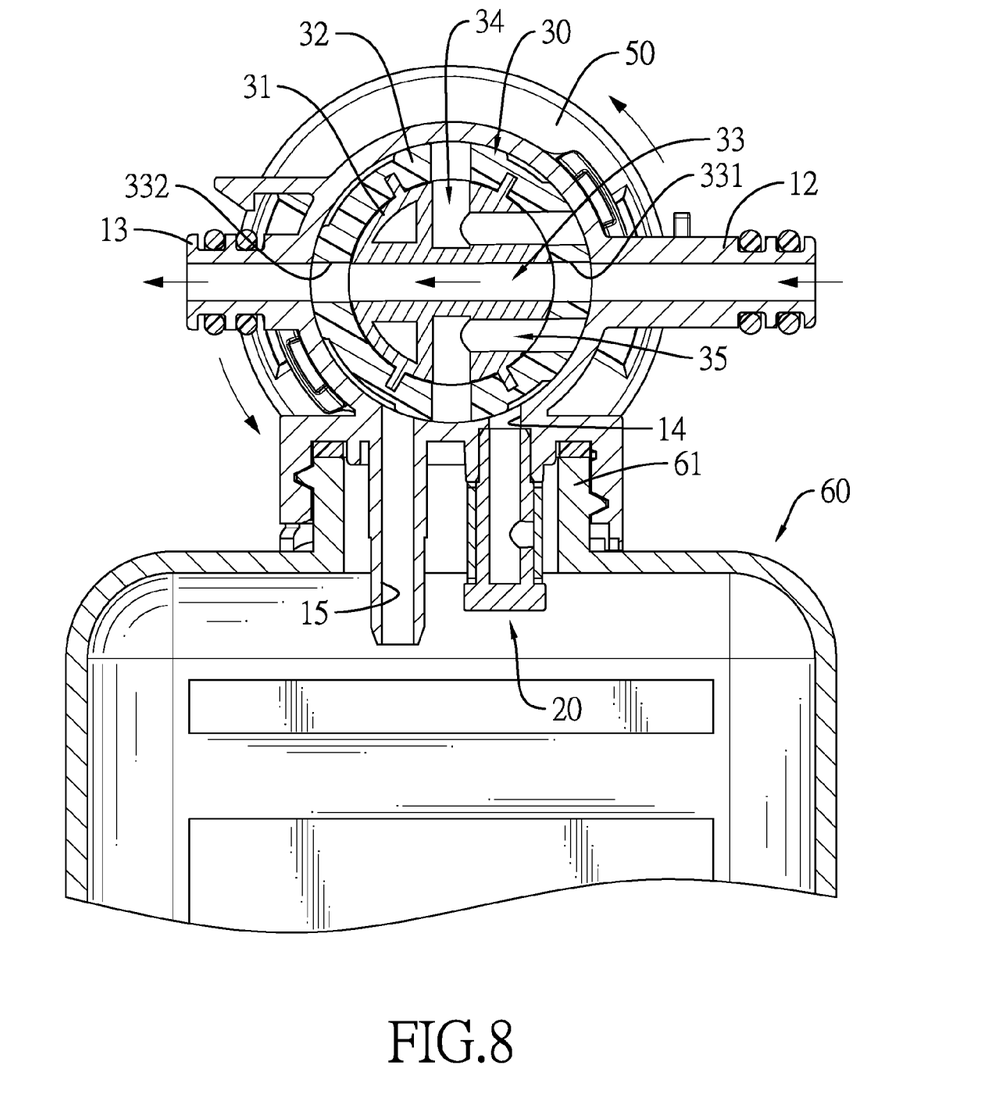
FIG. 8 is an operational cross-sectional rear view of the adapter in FIG. 1, showing the adapter is switched for inflating a tire.

In the first preferred embodiment, each of the first and second side channels 34, 35 is curved to 90 degrees. With reference to FIG. 8, thus, the flow direction switching device 30 can be switched to allow the central inlet 331 and the central outlet 332 of the central channel 33 to respectively communicate with the air inlet tube 12 and the outlet tube 13 of the adapting seat 10, and to allow the first side channel 34 and the second side channel 35 to be sealed. With reference to FIG. 5, alternatively, the flow direction switching device 30 can be switched to allow the first inlet 341 of the first side channel 34 to communicate with the air inlet tube 12, the first outlet 342 of the first side channel 34 to communicate with the air inlet channel 14, the second inlet 351 of the second side channel 35 to communicate with the outlet channel 15, and the second outlet 352 of the second side channel 35 to communicate with the outlet tube 13, and to allow the central channel 33 to be sealed.

As shown in FIGS. 2 to 5, in the preferred embodiment, the flow direction switching device 30 has a rotating member 31 and a sealing collar 32. The rotating member 31 has a direction switching portion 311 and a connecting portion 312. The connecting portion 312 axially extends out from a front end of the direction switching portion 311. The sealing collar 32 is securely mounted around the direction switching portion 311 of the rotating member 31, and airtightly abuts the inner surface in the switching chamber 112 of the adapting seat 10. The sealing collar 32 can rotate along with the rotating member 31. The central channel 33, the first side channel 34, and the second side channel 35 are formed in the direction switching portion 311 of the rotating member 31 and the sealing collar 32. Specifically, the rotating member 31 has multiple engaging ribs 313. The engaging ribs 313 are separately formed on an outer surface of the rotating member 31 and are arranged around the rotating member 31. The sealing collar 32 has an inner surface and multiple engaging recesses 321. The engaging recesses 321 are formed in the inner surface of the sealing collar 32 and respectively engage the engaging ribs 313 of the rotating member 31. Thus, the sealing collar 32 is securely attached to the rotating member 31 and does not rotate relative to the rotating member 31.

As shown in FIGS. 2 to 5, in the preferred embodiment, the direction switching portion 311 of the rotating member 31 is formed at a middle of the rotating member 31. The rotating member 31 further has a front portion 314 disposed in front of the direction switch portion 311. The connecting portion 312 of the rotating member 31 extends forwardly from an interior of the front portion 314 of the rotating member 31. The connecting portion 312 may be formed as two parallel rods. The flow direction switching device 30 further has a sealing ring 36. The sealing ring 36 of the flow direction switching device 30 is made of compressible and resilient materials, such as rubber, and is mounted on and around the front portion 314 of the rotating member 31. With further reference to FIG. 6, the sealing ring 36 of the flow direction switching device 30 is V-shaped in cross-section and has a rear end surface and an annular groove. The annular groove is formed in the rear end surface of the sealing ring 36 of the flow direction switching device 30. Thus, the sealing ring 36 of the flow direction switching device 30 radially and airtightly abuts the inner surface that is formed around the switching chamber 112 of the mounting base 11 of the adapting seat 10.

Figure 4:
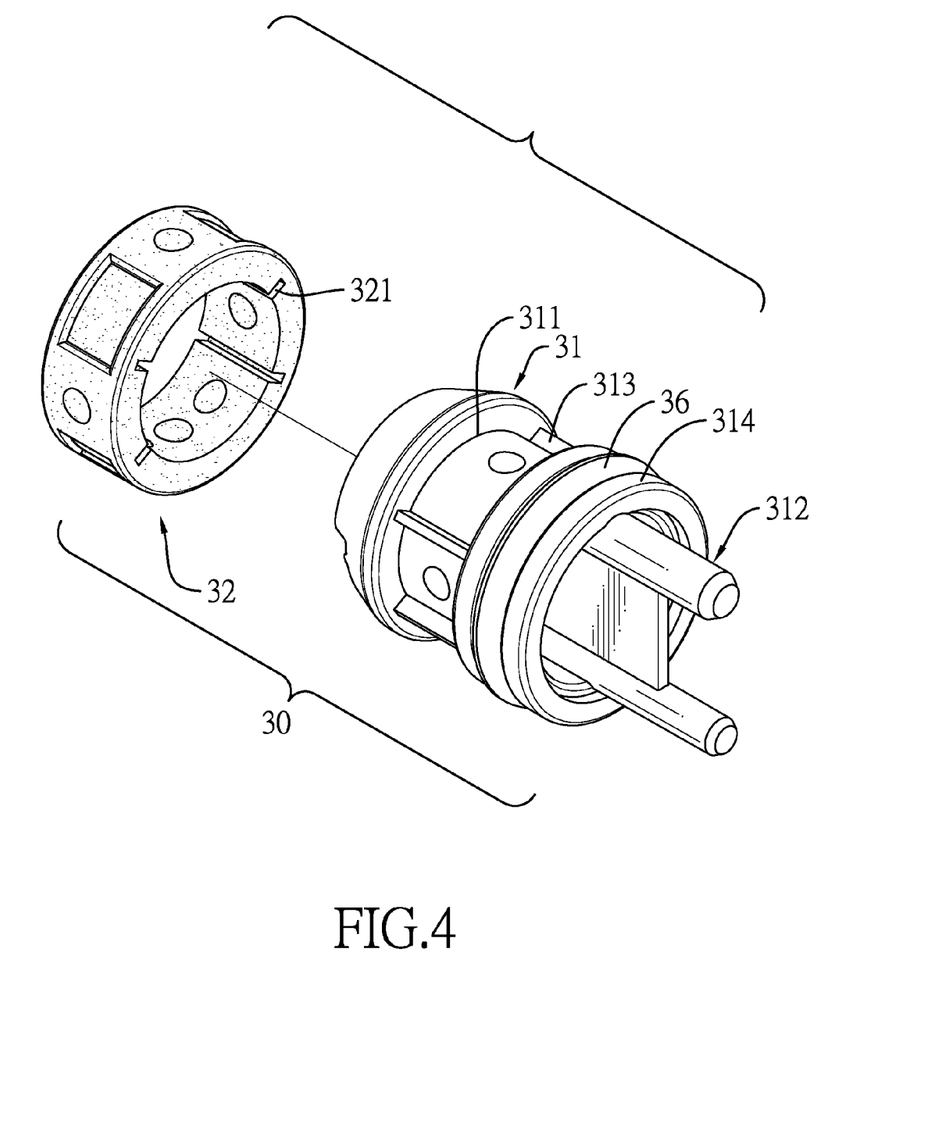
FIG. 4 is an exploded perspective view of a flow direction switching device of the adapter in FIG. 1.

As shown in FIGS. 3 to 5, in the preferred embodiment, the rotating member 31 of the flow direction switching device 30 further has a rear portion 315 and a limiting recess 316. The rear portion 315 of the rotating member 31 is disposed opposite to the front portion 314 of the rotating member 31. The limiting recess 316 is formed in the rear portion 315 of the rotating member 31. The adapting seat 10 further has a limiting protrusion 116. The limiting protrusion 116 is formed on the inner surface of the mounting base 11, is disposed adjacent to a rear end of the mounting base 11, and is mounted in the limiting recess 316 of the rotating member 31. Thus, a rotation range of the flow direction switching device 30 relative to the adapting seat 10 is limited. In the preferred embodiment, the flow direction switching device 30 can rotate relative to the adapting seat 10 within a range of 90 degrees.

As shown in FIGS. 2, 3, and 6, the connector 40 is securely mounted on a front end of the mounting base 11 of the adapting seat 10, such that the flow direction switching device 30 is held in the switching chamber 112 of the mounting base 11 and can only rotate relative to the adapting seat 10. In the preferred embodiment, the mounting base 11 of the adapting seat 10 further has multiple hooked protrusions 115 separately formed on the outer surface of the mounting base 11. The connector 40 has a mounting ring portion 41 and multiple latches 42. The mounting ring portion 41 is mounted to the front opening of the switching chamber 112 of the mounting base 11 of the adapting seat 10. The latches 42 protrude from the mounting ring portion 41 and extend toward a rear of the mounting ring portion 41. Each of the latches 42 has a distal end and a hooking recess 43. The hooking recess 43 is formed in the distal end of the latch 42. The hooking recesses 43 of the latches 42 are respectively hooked on the hooked protrusions 115 of the mounting base 11. The connecting portion 312 of the rotating member 31 of the flow direction switching device 30 protrudes through the mounting ring portion 41 of the connector 40.

As shown in FIGS. 2, 3, and 6, the switching button 50 is disposed in front of the adapting seat 10 and the connector 40 and is connected to the connecting portion 312 of the rotating member 31 of the flow direction switching device 30. As the switching button 50 is turned, the flow direction switching device 30 rotates in the switching chamber 112 of the adapting seat 10 accordingly. In the preferred embodiment, the switching button 50 has an outer surface, a rear end, an indication label 51, and two insertion holes 52. The rear end of the switching button 50 faces the adapting seat 10 and the connector 40. The indication label 51 is formed on the outer surface of the switching button 50. The insertion holes 52 are formed in the rear end of the switching button 50. The connecting portion 312 that is formed as the two parallel rods is inserted in the insertion holes 52 of the switching button 50, such that the switching button 50 is combined with the flow direction switching device 30.

With reference to FIGS. 5 and 6, the mounting recess 111 of the adapting seat 10 is securely mounted around the bottleneck 61 of the bottle 60 that contains tire cement. The air inlet tube 12 of the adapting seat 10 is connected to an air pumping device. The outlet tube 13 of the adapting seat 10 is connected to a tire valve of a tire through a guiding tube.

As shown in FIGS. 5 and 6, when patching the tire, the switching button 50 as well as the flow direction switching device 30 is turned to allow the first inlet 341 of the first side channel 34 to communicate with the air inlet tube 12 of the adapting seat 10, the first outlet 342 of the first side channel 34 to communicate with the air inlet channel 14 of the adapting seat 10, the second inlet 351 of the second side channel 35 to communicate with the outlet channel 15 of the adapting seat 10, the second outlet 352 of the second side channel 35 to communicate with the outlet tube 13 of the adapting seat 10, and the central channel 33 to be sealed. Then the air pumping device pumps high pressure air to flow through the air inlet tube 12 and the first side channel 34 of the flow direction switching device 30, and flow to the air valve 20 of the adapter. The high pressure air pushes the resilient valve sleeve 22 of the air valve 20 open and then flows into the bottle 60 that contains tire cement. Then the high pressure air extrudes the tire cement to flow out of the bottle 60 through the outlet channel 15 of the adapting seat 10, the second side channel 35 of the flow direction switching device 30, the outlet tube 13 of the adapter 10, and the guiding tube. Accordingly, the tire cement is extruded to flow through the tire valve and into the tire for patching the tire.

Figure 7:
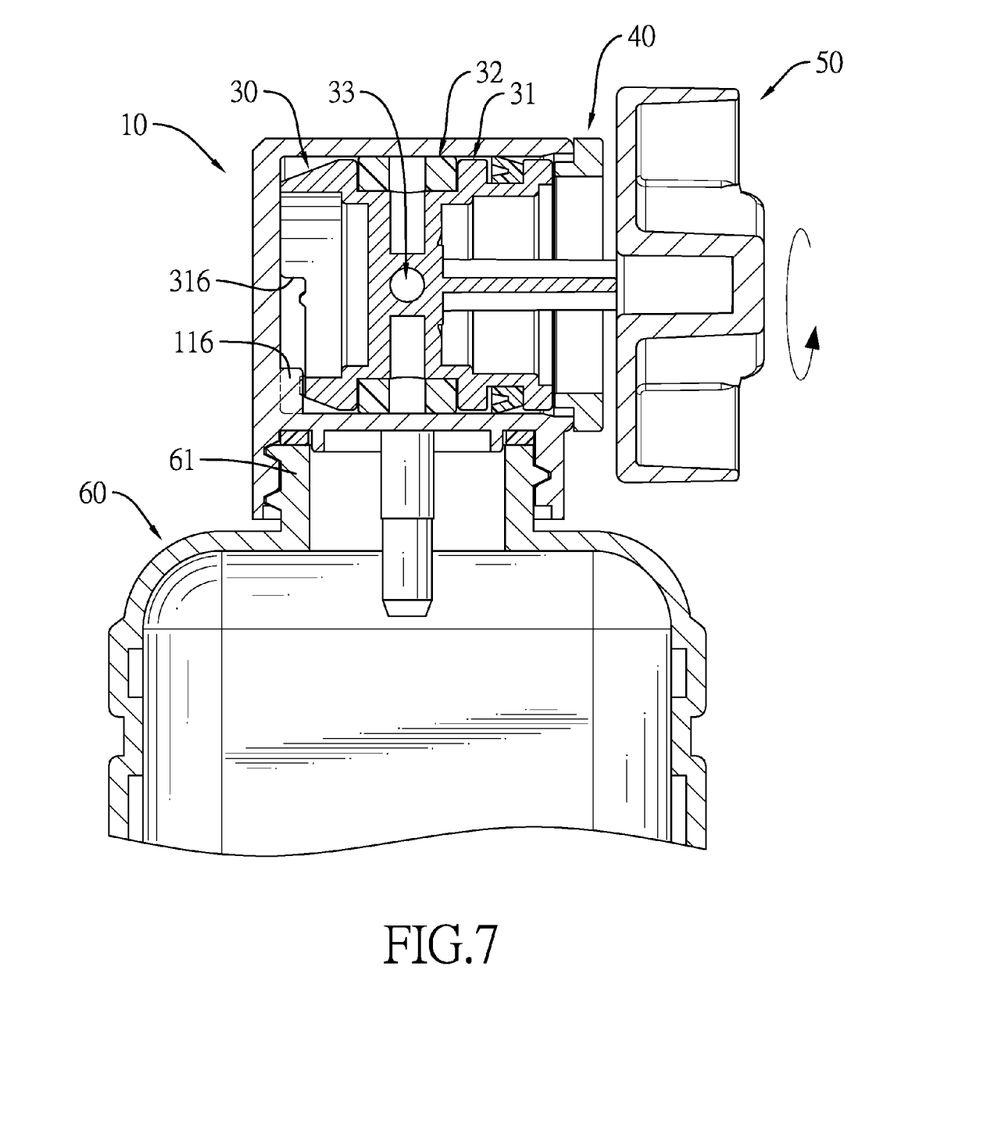
FIG. 7 is an operational cross-sectional side view of the adapter in FIG. 1, showing the adapter is switched for inflating a tire.

With reference to FIGS. 7 and 8, when inflating the tire, the switching button 50 as well as the flow direction switching device 30 is turned 90 degrees to allow the central inlet 331 and the central outlet 332 of the central channel 33 of the flow direction switching device 30 to respectively communicate with the air inlet tube 12 and the outlet tube 13 of the adapting seat 10, and the first side channel 34 and the second side channel 35 of the flow direction switching device 30 are sealed.

Thus, as the air pumping device pumps the high pressure air to the adapter, the high pressure air flows through the air inlet tube 12 of the adapting seat 10, the central channel 33 of the flow direction switching device 30, the outlet tube 13 of the adapting seat 10, and the guiding tube to inflate the tire through the tire valve.

The adapter of the tire cement dispenser as described can be switched to allow the air pumping device to selectively inflate the tire and extrude the tire cement for patching the tire. Since the adapter, the air pumping device, and the tire valve of the tire do not have to be connected to or disconnected from each other repeatedly, the tire cement dispenser with the adapter is convenient and time-saving for patching and inflating the tire.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An adapter of a tire cement dispenser comprising:
   an adapting seat having
      a mounting base having
         a mounting recess formed in a bottom of the mounting base and having a lower opening;
         a switching chamber transversely formed above the mounting recess, being circular in cross-section, and having a front opening;
         a dividing portion formed between the mounting recess and the switching chamber;
         an air inlet channel formed through the dividing portion and communicating with the mounting recess and the switching chamber; and
         an outlet channel formed through the dividing portion, disposed apart from the air inlet channel, and communicating with the mounting recess and the switching chamber;
      an air inlet tube formed on and protruding from an outer surface of the mounting base, communicating with the switching chamber, and disposed adjacent to the air inlet channel; and
      an outlet tube formed on and protruding from the outer surface of the mounting base, communicating with the switching chamber, aligning with the air inlet tube, and disposed adjacent to the outlet channel;

an air valve mounted to the air inlet channel of the adapting seat;

a flow direction switching device pivotally mounted airtightly in the switching chamber of the adapting seat, and having
- a central channel radially formed in the flow direction switching device and having a central inlet and a central outlet;
- a first side channel formed in the flow direction switching device, disposed beside the central channel, and having a first inlet and a first outlet; and
- a second side channel formed in the flow direction switching device, disposed beside the central channel and opposite to the first side channel, and having
  - a second inlet, the second inlet of the second side channel and the first outlet of the first side channel oppositely disposed beside the central inlet of the central channel; and
  - a second outlet aligning with the first inlet of the first side channel;

a connector securely mounted on a front end of the mounting base of the adapting seat to hold the flow direction switching device in the switching chamber of the mounting base; and a switching button disposed in front of the adapting seat and the connector, and connected to the flow direction switching device;

wherein when the central inlet and the central outlet of the central channel of the flow direction switching device respectively communicate with the air inlet tube and the outlet tube of the adapting seat, the first side channel and the second side channel of the flow direction switching device are sealed; and when the first inlet of the first side channel communicates with the air inlet tube of the adapting seat, the first outlet of the first side channel communicates with the air inlet channel of the adapting seat, the second inlet of the second side channel communicates with the outlet channel of the adapting seat, and the second outlet of the second side channel communicates with the outlet tube of the adapting seat, the central channel is sealed.

2. The adapter as claimed in claim 1, wherein
the mounting base of the adapting seat further has an inner surface formed around the switching chamber of the mounting base;
the flow direction switching device has
  a rotating member having
    a direction switching portion; and
    a connecting portion extending out from a front end of the direction switching portion and connected to the switching button; and
  a sealing collar securely mounted around the direction switching portion of the rotating member, and airtightly abutting the inner surface in the switching chamber of the adapting seat;
the central channel, the first side channel, and the second side channel of the flow direction switching device are formed in the direction switching portion of the rotating member and the sealing collar; and
each of the first and second side channels of the flow direction switching device is curved to 90 degrees;
wherein the sealing collar rotates along with the rotating member.

3. The adapter as claimed in claim 2, wherein
the direction switching portion of the rotating member is formed at a middle of the rotating member;
the rotating member further has a front portion disposed in front of the direction switch portion;
the connecting portion of the rotating member extends forwardly from an interior of the front portion of the rotating member; and
the flow direction switching device further has a sealing ring, the sealing ring of the flow direction switching device is mounted on and around the front portion of the rotating member, is V-shaped in cross-section, and has a rear end surface; and
an annular groove formed in the rear end surface of the sealing ring of the flow direction switching device;
wherein the sealing ring of the flow direction switching device radially and airtightly abuts the inner surface that is formed around the switching chamber of the adapting seat.

4. The adapter as claimed in claim 2, wherein
the rotating member further has
  a rear portion; and
  a limiting recess formed in the rear portion of the rotating member; and
the adapting seat further has a limiting protrusion formed on the inner surface of the mounting base, disposed adjacent to a rear end of the mounting base, and mounted in the limiting recess of the rotating member.

5. The adapter as claimed in claim 3, wherein
the rotating member further has
  a rear portion; and
  a limiting recess formed in the rear portion of the rotating member; and
the adapting seat further has a limiting protrusion formed on the inner surface of the mounting base, disposed adjacent to a rear end of the mounting base, and mounted in the limiting recess of the rotating member.

6. The adapter as claimed in claim 5, wherein
the rotating member further has multiple engaging ribs separately formed on an outer surface of the rotating member and arranged around the rotating member; and
the sealing collar has
  an inner surface; and
  multiple engaging recesses formed in the inner surface of the sealing collar and respectively engaging with the engaging ribs of the rotating member.

7. The adapter as claimed in claim 5, wherein the switching button has
  an outer surface; and
  an indication label formed on the outer surface of the switching button.

8. The adapter as claimed in claim 1, wherein the air valve has
  a valve rod mounted to the air inlet channel of the adapting seat and having
    a sidewall;
    an upper open end protruding into the air inlet channel;
    a lower closed end;
    an internal channel formed in the valve rod and extending between the upper open end and the lower closed end of the valve rod; and
    an air hole radially formed through the sidewall of the valve rod; and
  a resilient valve sleeve mounted around the valve rod and covering the air hole of the valve rod.

9. The adapter as claimed in claim 4, wherein
a valve rod mounted to the air inlet channel of the adapting seat and having
a sidewall;
an upper open end protruding into the air inlet channel;
a lower closed end;
an internal channel formed in the valve rod and extending between the upper open end and the lower closed end of the valve rod; and
an air hole radially formed through the sidewall of the valve rod; and
a resilient valve sleeve mounted around the valve rod and covering the air hole of the valve rod.

10. The adapter as claimed in claim 5, wherein
a valve rod mounted to the air inlet channel of the adapting seat and having
a sidewall;
an upper open end protruding into the air inlet channel;
a lower closed end;
an internal channel formed in the valve rod and extending between the upper open end and the lower closed end of the valve rod; and
an air hole radially formed through the sidewall of the valve rod; and
a resilient valve sleeve mounted around the valve rod and covering the air hole of the valve rod.

11. The adapter as claimed in claim 8, wherein
the mounting base of the adapting seat further has multiple hooked protrusions separately formed on the outer surface of the mounting base;
the connector has
a mounting ring portion mounted to the front opening of the switching chamber of the adapting seat; and
multiple latches protruding from the mounting ring portion and extending toward a rear of the mounting ring portion, each of the latches having
a distal end; and
a hooking recess formed in the distal end of the latch, and the hooking recesses of the latches respectively hooked on the hooked protrusions of the mounting base; and
the flow direction switching device protrudes through the mounting ring portion of the connector.

12. The adapter as claimed in claim 9, wherein
the mounting base of the adapting seat further has multiple hooked protrusions separately formed on the outer surface of the mounting base;
the connector has
a mounting ring portion mounted to the front opening of the switching chamber of the adapting seat; and
multiple latches protruding from the mounting ring portion and extending toward a rear of the mounting ring portion, each of the latches having
a distal end; and
a hooking recess formed in the distal end of the latch, and the hooking recesses of the latches respectively hooked on the hooked protrusions of the mounting base; and
the flow direction switching device protrudes through the mounting ring portion of the connector.

13. The adapter as claimed in claim 10, wherein
the mounting base of the adapting seat further has multiple hooked protrusions separately formed on the outer surface of the mounting base;
the connector has
a mounting ring portion mounted to the front opening of the switching chamber of the adapting seat; and
multiple latches protruding from the mounting ring portion and extending toward a rear of the mounting ring portion, each of the latches having
a distal end; and
a hooking recess formed in the distal end of the latch, and the hooking recesses of the latches respectively hooked on the hooked protrusions of the mounting base; and
the flow direction switching device protrudes through the mounting ring portion of the connector.

14. The adapter as claimed in claim 8, wherein
the mounting recess of the mounting base is circular in cross-section;
the mounting base further has a threaded wall formed around the mounting recess; and
the adapting seat further has
multiple sealing rings mounted around the air inlet tube and the outlet tube; and
a sealing pad being annular and mounted in the mounting recess on the dividing portion of the mounting base.

15. The adapter as claimed in claim 9, wherein
the mounting recess of the mounting base is circular in cross-section;
the mounting base further has a threaded wall formed around the mounting recess; and
the adapting seat further has
multiple sealing rings mounted around the air inlet tube and the outlet tube; and
a sealing pad being annular and mounted in the mounting recess on the dividing portion of the mounting base.

16. The adapter as claimed in claim 10, wherein
the mounting recess of the mounting base is circular in cross-section;
the mounting base further has a threaded wall formed around the mounting recess; and
the adapting seat further has
multiple sealing rings mounted around the air inlet tube and the outlet tube; and
a sealing pad being annular and mounted in the mounting recess on the dividing portion of the mounting base.

17. The adapter as claimed in claim 1, wherein
the adapting seat further has an engaging hook formed on and protruding from the outer surface of the mounting base, and disposed beside the outlet tube; and
the mounting base further has a resilient protrusion formed on the bottom of the mounting base.

18. The adapter as claimed in claim 4, wherein
the adapting seat further has an engaging hook formed on and protruding from the outer surface of the mounting base, and disposed beside the outlet tube; and
the mounting base further has a resilient protrusion formed on the bottom of the mounting base.

19. The adapter as claimed in claim 5, wherein
the adapting seat further has an engaging hook formed on and protruding from the outer surface of the mounting base, and disposed beside the outlet tube; and
the mounting base further has a resilient protrusion formed on the bottom of the mounting base.

20. The adapter as claimed in claim 11, wherein
the mounting recess of the mounting base is circular in cross-section;
the mounting base further has a threaded wall formed around the mounting recess;

the adapting seat further has
multiple sealing rings mounted around the air inlet tube and the outlet tube; and
a sealing pad being annular and mounted in the mounting recess on the dividing portion of the mounting base;

the adapting seat further has an engaging hook formed on and protruding from the outer surface of the mounting base, and disposed beside the outlet tube; and the mounting base further has a resilient protrusion formed on the bottom of the mounting base.

\* \* \* \* \*